Oct. 30, 1962  R. E. GAYLE  3,061,231
FISHING REEL
Filed April 3, 1961
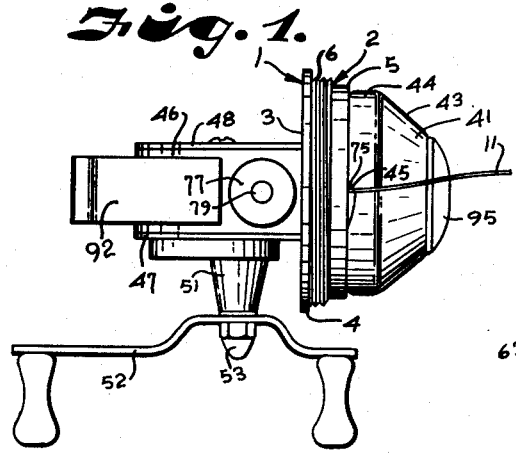
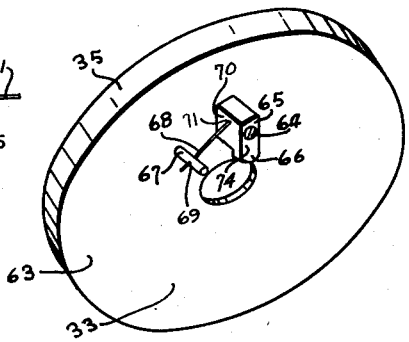
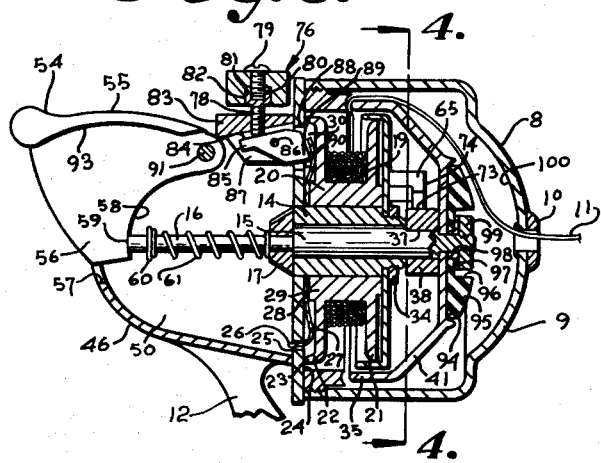
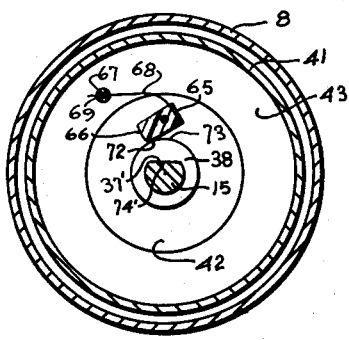
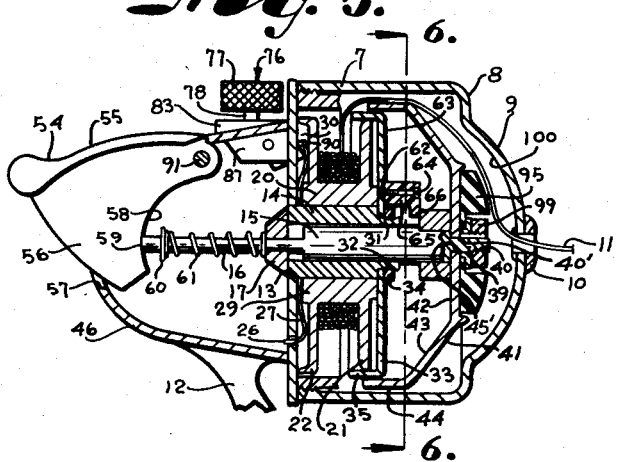
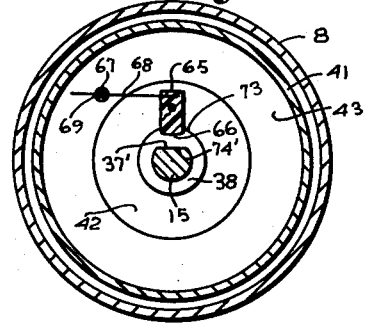
INVENTOR.
ROBERT E. GAYLE
BY
Fishburn & Gold
ATTORNEYS United States Patent Office 3,061,231
Patented Oct. 30, 1962

3,061,231
FISHING REEL
Robert E. Gayle, Shawnee Mission, Kans. (% Phantom Products, Inc., 1800 Central St., Kansas City, Mo.)
Filed Apr. 3, 1961, Ser. No. 100,096
1 Claim. (Cl. 242—84.2)

This invention relates to improvements in fishing reels of the spinning type wherein the spool holding the line is stationary and the fishing line rolls off one end of the spool when casting.

The present application is a continuation in part of my application Serial No. 81,106 filed January 6, 1961.

The principal object of the present invention is to provide an improved line pick-up and release mechanism, and more specifically a spooling member rotatable with a shaft carried by the frame of the reel and having notches in the side face thereof for engaging a line to cause the line to rewind upon the spool by turning of a crank also carried by the frame after the line has been cast, and to provide means carried by a plate on a sleeve bearing member for engagement with a sleeve on the shaft to hold the spooling member disengaged from the line and for releasing of the means from the sleeve on the shaft upon turning of the crank of the reel.

Other objects of the present invention are to provide a brake or guard plate on the bearing member adjacent the spool over which the line rolls when casting; to provide for mounting of a dog member on the guard plate having a flange portion facing the shaft of the reel; to provide spring means for urging the dog towards the shaft of the reel when the spooling member is engaged with the line; to provide means for moving the shaft axially to cause the dog to engage behind a sleeve on the shaft to hold the spooling member disengaged from the line; to provide for movement of the dog from behind the sleeve on the shaft by friction to release the dog to cause the spooling member to again engage the line upon rotation of the crank for picking up the line and winding it on the spool when it is retrieved after casting; and to provide means operable outside the frame of the reel for moving the spooling member out of contact with the spool to allow the line to be peeled off the spool when casting.

Still further objects of the present invention are to provide drag means for regulating movement of the spool; to provide a gear drive mechanism for a reel of this type to facilitate casting and retrieving of the line and accelerating the retrieving speed thereof; and to provide the adjustable drag mechanism operable to play out the line when the tension exceeds the predetermined amount of pressure; and to provide a device of this character, simple and economical to manufacture.

Other objects of this invention will become apparent from the following description taken in connection with the accompanying drawings wherein are set forth by way of illustration and example certain embodiments of this invention.

FIG. 1 is a top plan view with the cover member removed.

FIG. 2 is a perspective view of the plate member on the bearing sleeve showing the dog member for holding the spooling member out of contact with the line.

FIG. 3 is a cross-sectional view illustrating the line engaged with the spooling member when in reeling position.

FIG. 4 illustrates the dog member in inoperable position shown in FIG. 3.

FIG. 5 is a cross-sectional view showing the dog member engaged with the sleeve on the shaft to hold the spooling member disengaged from the line.

FIG. 6 is a view of the dog member in the position shown in FIG. 5.

Referring more in detail to the drawing:

1 designates a reel embodying the features of my invention which includes a frame or casing designated generally at 2 and including a back or end plate 3 generally circumferential in form having a marginal flange 4 and a circumferential flange 5 between which are provided threads 6 for receiving an internally threaded flange 7 of a cover 8 having a somewhat conical or rounded end 9 provided with a grommet or the like 10 through which a line 11 is adapted to extend.

To mount the reel upon a fishing rod (not shown) there is provided the usual connecting member or tang (also not shown) which is connected to the frame of the reel by a shank 12. The back plate 3 has an opening 13 substantially at the center thereof, and secured therein is a sleeve bearing member 14 in which is rotatably mounted a drive shaft 15 having a reduced end 16 extending rearwardly from the plate 3 and outwardly through the sleeve bearing member 14 and mounted thereon is a pinion 17 which bears against the end of the sleeve bearing 14, the sleeve bearing being stationary and press fitted or otherwise permanently mounted in the opening 13.

The fishing line 11 is mounted upon an angular cylindrical grooved portion or core 19 of a line spool 20 having opposed spool ends 21 and 22 for accommodating the line therebetween and the end 22 is turned laterally away from the end 21 forming an angular flange 23 which engages against the inside or front wall 24 of the end plate 3 of the frame structure, as illustrated in FIG. 3. The end plate 3 is provided with a slot 25 for (FIG. 3) receiving a laterally turned flange portion 26 of a spring steel washer 27 which engages over the sleeve bearing 14 and between the end 28 of a hub portion 29 of the line spool 20, the circumferential portion of the spring washer engaging in the space 30 between the hub 29 and the flange 23 on the end 22 of the line spool for a purpose later described.

The sleeve bearing 14 extends forwardly from the end plate 3 and is reduced as indicated at 31 and threaded as indicated at 32. Mounted upon the threaded reduced portion 31 is a brake or guide plate 33 secured on the sleeve by a nut 34. The plate 33 has a circumferential flange portion 35 forming a rim extending over the end 21 of the line spool 20 and towards the back plate 3 as illustrated in FIG. 3. The drive shaft 15 is rotatably and axially slidable in the bearing 14 and has its outer end 37 reduced on one side as indicated at 37' for receiving a sleeve member 38. The shaft 15 is further reduced as indicated at 39 and threaded as indicated at 40, and flattened on one side as at 40'.

Mounted upon the reduced end portion 39 of the shaft is a spooling member 41 of circular formation having a plate portion 42 and a portion 43 sloping toward the spool 20 and circumferential flange portion 44 also extending toward the spool 20. The rim portion of the flange 44 is provided with spaced notches 45 for a purpose later described. One side of the opening 45' in the spooling member is flat to engage the flat side of 40' of the shaft 15 to rotate therewith.

The frame 2 of the reel includes a substantially U-shaped bracket member 46 having the ends of the arms thereof rigidly secured to the rear face of the end plate 3 and mounted on each side of the U-shaped brackets are side plates 47 and 48 which are substantially identical in shape to fit the contour of the edges of the bracket member 46. The plate 47 has an opening (not shown) through which extends a shaft having a gear (also not shown but illustrated in application Serial No. 81,106) on the inner end thereof and located within the housing 50, formed by the plates 47 and 48 and the bracket 46, meshing with the pinion 17 on the shaft 15.

Mounted outside the plate 47 and extending laterally therefrom is a cylindrical hub member 51 surrounding the shaft having a reduced threaded end (not shown) for receiving a crank member 52 held on the shaft by a threaded nut 53. The mechanism just above described is the same as illustrated and described in my co-pending application Serial No. 81,106.

The actuating or drive shaft 15 is moved lengthwise to position the spooling member 41 by means of a thumb piece 54 of slightly curved formation as indicated at 55 and has an arm portion 56 extending through a slot 57 in the bracket 46. The thumb piece is located at the rear of the bracket and slightly above the center thereof and the arm or rib 56 has a curved inner face 58 for engaging against the end 59 of the reduced end 16 of the drive shaft 15. The reduced end 16 has a stop member 60 mounted thereon and a coil spring 61 has one end engaging thereagainst and its other end against the end of the pinion 17, as illustrated in FIG. 3, to exert pressure rearwardly on the spooling member when in normal position but when the thumb piece 54 is depressed the spooling member will move axially away from the spool as later described.

Mounted in a threaded opening 62 in the face 63 of the plate 33 by a pin 64 is a dog member 65 having a flanged end or lip 66 facing the shaft 15. A peg 67 is spaced from the dog and mounted on the face 63 of the plate 33 and a wire spring 68 extends through an opening 69 in the peg and has its other end rigidly secured in the side face 70 of the dog as indicated at 71.

When the reel is in winding position, as shown in FIG. 3, the dog 65 is in the position as shown therein with the side edge 72 of the lip engaging against the side 73 of the sleeve 38. To release the line for casting, the thumb member 54 is depressed moving the shaft 15 axially in the sleeve 14 carrying with it the sleeve 38 so that the outer edge 74 of the dog 65 will engage behind the sleeve 38 as illustrated in FIG. 5 to permit the line to be unwound from the spool, or allow free spooling, the outer surface 74 of the dog engaging the sleeve and holding the shaft extended axially in the frame. When it is desired to wind the line on the spool, rotation of the crank will, due to frictional engagement of the continuous unbroken end surface of the sleeve on the dog cause the dog to rock against the action of the spring to move the lip from under the edge of the sleeve and again assume the position on the outwardly facing cylindrical surface thereof as shown in FIG. 3. The shaft 15 over which the sleeve 38 engages has a flat surface 37' (FIG. 6) and the sleeve has a flat surface 74' to rotate the sleeve with the shaft.

Means for the pick up of the line which is usually carried by the spooling member and heretofore illustrated and described in my co-pending application Serial No. 81,106, are illustrated as spaced notches or grooves 45 having hook portions 75 in the rim of the flange portion 44 of the spooling member, as best illustrated in FIG. 1. When the reel is in the position shown in FIG. 3, the hooks will engage the line and rotation of the crank 52 will wind the line on the spool 20. Movement of the thumb piece 54 will move the shaft 15 forwardly thus releasing the line from the hook 75, as shown in the position for free spooling, illustrated in FIG. 5. When the spooling member is thus moved forwardly or to the right, the flange 44 thereof will move past the flange portion 35 of the plate 33 and thus removes the line from the hook 75.

An adjustable drag mechanism indicated generally at 76 is provided for permitting limited or restricted rotation of the spool member 20 so that line 11 may peel off of the spool with the desired drag thereon. The mechanism includes a dial plate 77 which is attached to a short shaft 78 by a screw or the like 79 which engages in the threaded socket 80 of a head 81 which engages in a socket 82 on the lower side of the plate 77.

The shaft 78 has a threaded lower end which engages in a threaded plate 83 forming a portion of the bracket 46 and has its lower end extending therethrough and engaging the top side 84 of a lever member 85 pivotally mounted by a pin 86 on spaced brackets 87 carried on the underneath side of the bracket 46. The plate 3 of the frame member 2 is provided with a slot 88 through which the forward end 89 of the lever member 85 extends and which engages against the side 90 of the spring washer or drag member 27. By turning of the knurled plate 77 the proper adjustment may be made on the drag mechanism to cause the required tension of the spring washer member 27 against the side of the end portion 22 of the spool to provide restricted rotation thereof.

The thumb member 54 is pivotally mounted to the U-shaped member 46 by a pin 91 extending through an opening in the forward portion of the arm portion 56 of the member. The portion 92 of the thumb member 54 is wider than the arm portion providing an overhanging portion 93 which when the thumb member is depressed will rest against the outer surface of the bracket 46.

The arrangement is such that a fisherman may rest his thumb on the thumb piece 54 and by pressure thereon, project the shaft 15 forwardly to free the hook 75 on the spooling member from the line 11 so that the line may be cast. Continued pressure on the thumb member will project the shaft and carry with it, the spooling member, the outer edge of which has a recessed portion 94 for receiving a circular rubber washer member 95 having a socket portion 96 for receiving a washer 97 which has a boss 98 extending into the opening in the washer and which is held on the shaft by a nut 99. When the shaft 15 with the spooling member mounted thereon is thus projected by pressure on the thumb member 54, the line 11 will be snubbed between the rubber washer 95 and the inside 100 of the cover member 8 as illustrated in my co-pending application Serial No. 81,106. Pressure on the thumb member is continued during the back swinging of the arm and after the forward cast is started release of the thumb will release the grip on the line through the stubbing action, as above described to allow free spooling of the apparatus.

In operation of a reel constructed and assembled as described, wherein the cast is to be made, as above stated, the thumb member 54 is manipulated to move the drive shaft 15 forwardly carrying with it the spooling member 41 to snub the line 11 between the inside 100 of the cover 8 and the curved surface of the rubber washer member 95 on the end of the spooling member. This snubbing is continued until the backward swing of the arm. After start of movement of the arm forwardly, release of the thumb member 54 will release the line from the snub and allow the line to peel off of the spool as in the position shown in FIG. 3.

It will further be noted that when the shaft 15 is moved forwardly, the dog 65 will engage the edge of the sleeve member 38 on the shaft and thus prevent return of the spooling member to engagement with the line.

It will be noted the line 11 passes over the flange portion 35 of the guard plate 33 and also the flange portion 44 of the spooling member 41. This position allows free spooling of the line for casting.

When it is desired to retrieve the line, turning of the crank 52 will immediately, due to friction of the edge of the sleeve 38 on the surface 74 of the dog 65 cause the dog to rock or rotate against tension of the spring 68 out from under the sleeve and the shaft 15 will retreat or move to the left. The flange portion 44 of the spooling member will move axially toward the spool 20 the lip moving inside of the flange portion 44 of the spooling member to the position shown in FIG. 3 and when in this position the line will be picked up by a hook 75 of the notches in response to further rotation of the crank and spooling member and cause the line to be rewound upon the spool by continuing operation of the crank.

It will be obvious that turning of the crank immediately releases the dog from holding the spooling member extended so that the spooling member will immediately move radially to the left to engage the line to start rewinding.

It is to be understood that while I have illustrated and described one form of my invention it is not to be limited to the specific form and arrangement of parts herein described and shown except insofar as such limitations are included in the claim.

I claim:

In a spinning reel for fishing line including a frame, a sleeve bearing carried on said frame, a shaft rotatably mounted and axially slidable in said sleeve bearing, a normally stationary spool arranged to hold the line and mounted for free delivery of the line over an end thereof, a spooling member mounted on said shaft and rotatable therewith, resilient means urging said spooling member toward said spool, a guide plate mounted on said sleeve between said spool and spooling member, a cover for said spool and spooling member and having an opening coaxial with said shaft for receiving the line, manually operable means connected to said shaft outside said cover for selectively rotating said shaft, said spooling member including an outer ring portion projecting toward said spool and having a rim normally encircling said guide plate and a portion of said spool, hook means on said rim for selectively engaging said line, means for selectively axially displacing said spooling member from a position adjacent said spool to a position axially remote from said spool and said guide plate for disengaging said line from said hook means permitting free movement of the line from the spool, said spooling member on said shaft having a sleeve member coaxially about said shaft and rotatable therewith, said sleeve member projecting toward said guide plate and having a continuous unbroken end surface facing said guide plate, said sleeve member having a radially outwardly facing cylindrical surface terminating adjacent said end surface, a dog pivotally mounted on said guide plate and having a lip portion for selectively engaging said outwardly facing cylindrical surface and said end surface, and spring means resiliently urging said lip portion radially inwardly of said cylindrical surface for contacting said end surface to retain said spooling member in said displaced position, whereupon the rotation of said shaft creates a frictional force between said lip portion and said end surface for frictionally pivoting said lip portion out of engagement with said end surface causing said resilient means to return said spooling member to said position adjacent said spool.

References Cited in the file of this patent

UNITED STATES PATENTS

| 2,584,020 | Humphreys | Jan. 29, 1952 |
| 2,613,468 | Hand | Oct. 14, 1952 |
| 2,644,647 | Denison et al. | July 7, 1953 |
| 3,020,666 | Hull | Feb. 13, 1962 |

FOREIGN PATENTS

| 820,874 | Great Britain | Sept. 30, 1959 |